United States Patent
Eitzman et al.

(12) 
(10) Patent No.: US 6,454,986 B1
(45) Date of Patent: Sep. 24, 2002

(54) METHOD OF MAKING A FIBROUS ELECTRET WEB USING A NONAQUEOUS POLAR LIQUID

(75) Inventors: Philip D. Eitzman, Lake Elmo; Alan D. Rousseau, Stillwater; Marvin E. Jones, Grant; Seyed A. Angadjivand, Woodbury, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/416,216

(22) Filed: Oct. 8, 1999

(51) Int. Cl.[7] .................. D06M 13/127; D06M 13/144; D06M 13/248; D06M 13/345; D06M 13/402

(52) U.S. Cl. ...................... 264/442; 264/101; 264/344; 264/345; 264/346

(58) Field of Search ................................ 264/101, 344, 264/345, 346, 442

(56) References Cited

U.S. PATENT DOCUMENTS

| | | |
|---|---|---|
| 3,366,721 A | 1/1968 | Burdge et al. |
| 3,959,421 A | 5/1976 | Weber et al. |
| 4,118,531 A | 10/1978 | Hauser |
| 4,204,828 A | 5/1980 | Peckingpaugh et al. |
| 4,213,168 A | 7/1980 | Garbett |
| 4,215,682 A | 8/1980 | Kubik et al. |
| 4,277,430 A | 7/1981 | Peckinpaugh et al. |
| 4,288,584 A | 9/1981 | Mishra |
| RE30,782 E | 10/1981 | van Turnhout |
| 4,340,563 A | 7/1982 | Appel et al. |
| RE31,285 E | 6/1983 | van Turnhout et al. |
| 4,548,628 A | 10/1985 | Miyake et al. |
| 4,588,537 A | 5/1986 | Klaase et al. |
| RE32,171 E | 6/1986 | van Turnhout |
| 4,592,815 A | 6/1986 | Nakao |
| 4,594,202 A | 6/1986 | Pall et al. |
| 4,652,282 A | 3/1987 | Ohmori et al. |
| 4,789,504 A | 12/1988 | Ohmori et al. |

(List continued on next page.)

FOREIGN PATENT DOCUMENTS

| | | |
|---|---|---|
| EP | 0 594 123 A1 | 4/1994 |
| EP | 0 845 554 A2 | 6/1998 |
| JP | 60-947 | 1/1985 |
| JP | 60-15137 | 4/1985 |
| SU | 423483 A | 4/1974 |
| WO | WO 95/22646 | 8/1995 |
| WO | WO 96/00093 | 1/1996 |

OTHER PUBLICATIONS

Japan Technology Highlights, *Removal of Static Electricity with Water Spray*, v.6, n. 23, pp. 5–6 (Nov. 15, 1995).

Chudleigh, P.W., *Charging of Polymer Foils Using Liquid Contacts*, Appl. Phys. Lett., v. 21, n. 11 (Dec. 1, 1972).

Chudleigh, P.W., *Mechanism of Charge Transfer to a Polymer Surface by a Conducting Liquid Contact*, Journal of Applied Physics, v. 47, n. 10 (Oct. 1976).

Quin, G–W. et al., *The Effect of Water–quenching on the Electrostatic Charging of Fibers and Fabrics During the Melt–blowing Process*, J. Text. Inst. 1999, 90 Part 1, No. 2.

(List continued on next page.)

*Primary Examiner*—Leo B. Tentoni
(74) *Attorney, Agent, or Firm*—Karl G. Hanson

(57) ABSTRACT

A method of charging fibrous webs with nonaqueous polar liquids. A web 20 that contains nonconductive fibers is wetted with a nonaqueous polar liquid 14. The web 20 is then substantially dried 22 to provide a fibrous electret web. The fibrous electret web can be used as a filter in a filtration face mask 40 that is adapted to cover the nose and mouth of the wearer. The present method has the advantage over known charging methods in that the nonaqueous liquid requires less energy for drying than is required for aqueous liquids. Additionally, many filter webs can be directly wetted with nonaqueous liquids, which cannot be easily wetted with aqueous liquids.

40 Claims, 1 Drawing Sheet

U.S. PATENT DOCUMENTS

| | | |
|---|---|---|
| 4,798,850 A | 1/1989 | Brown |
| 4,874,399 A | 10/1989 | Reed et al. |
| 4,874,659 A | 10/1989 | Ando et al. |
| 4,931,230 A | 6/1990 | Krueger et al. |
| 4,950,549 A | 8/1990 | Rolando et al. |
| 5,057,710 A | 10/1991 | Nishiura et al. |
| 5,078,925 A | 1/1992 | Rolando et al. |
| 5,254,378 A | 10/1993 | Krueger et al. |
| 5,280,406 A | 1/1994 | Coufal et al. |
| 5,370,830 A | 12/1994 | Jameson et al. |
| 5,401,446 A | 3/1995 | Tsai et al. |
| 5,411,576 A | 5/1995 | Jones et al. |
| 5,472,481 A | 12/1995 | Jones et al. |
| 5,496,507 A | 3/1996 | Angadjivand et al. |
| 5,525,397 A | 6/1996 | Shizuno et al. |
| 5,592,357 A | 1/1997 | Rader et al. |
| 5,665,278 A | 9/1997 | Allen et al. |
| 5,780,153 A | 7/1998 | Chou et al. |
| 5,908,598 A | 6/1999 | Rousseau et al. |
| 5,919,847 A | 7/1999 | Rousseau et al. |
| 5,968,635 A | 10/1999 | Rouseau et al. |
| 5,976,208 A | 11/1999 | Rousseau et al. |

OTHER PUBLICATIONS

Strobel, M. et al., *Plasma Fluorination of Polyolefins*, Journal of Polymer Science: Part A: Polymer Chemistry, v. 25, 1295–1307 (1987).

Wente, Van A., *Superfine Thermoplastic Fibers*, Industrial and Engineering Chemistry, v. 48, n. 8, pp. 1342–1346 (Aug. 1956).

Yatsuzuka et al, K. et al., *Electrification of Polymer Surface Caused by Sliding Ultrapure Water*, IEEE Transactions on Industry Applications, v. 32, n. 4 (Jul./Aug. 1996).

METHOD OF MAKING A FIBROUS ELECTRET WEB USING A NONAQUEOUS POLAR LIQUID

The present invention pertains to a method of charging fibrous webs through use of a nonaqueous polar liquid.

BACKGROUND

Electrically-charged nonwoven webs are commonly used as filters in respirators to protect the wearer from inhaling airborne contaminants. U.S. Pat. Nos. 4,536,440, 4,807,619, 5,307,796, and 5,804,295 disclose examples of respirators that use these filters. The electric charge enhances the ability of the nonwoven web to capture particles suspended in a fluid. The particles are captured as the fluid passes through the nonwoven web. The nonwoven web typically contains fibers that comprise dielectric—that is, nonconductive—polymers. Electrically-charged dielectric articles are often referred to as "electrets", and a variety of techniques have been developed over the years for producing these products.

Early work relating to electrically-charging polymer foils is described by P. W. Chudleigh in *Mechanism of Charge Transfer to a Polymer Surface by a Conducting Liquid Contact*, 21 APPL. PHYS. LEJT., 547–48 (Dec. 1, 1972), and in *Charging of Polymer Foils Using Liquid Contacts*, 47 J. APPL. PHYS., 4475–83 (Oct. 1976). Chudleigh's method involves charging a polyfluorothylene polymer foil by applying a voltage to the foil. The voltage is applied through a conducting liquid that contacts the foil surface.

An early-known technique for making a polymeric electret in fibrous form is disclosed in U.S. Pat. No. 4,215,682 to Kubic and Davis. In this method, the fibers are bombarded with electrically-charged particles as they issue from a die orifice. The fibers are created using a "melt-blowing" process, where a stream of gas, which is blown at high velocity next to the die orifice, draws out the extruded polymeric material and cools it into a solidified fiber. The bombarded melt-blown fibers accumulate randomly on a collector to create the fibrous electret web. The patent mentions that filtering efficiency can be improved by a factor of two or more when the melt-blown fibers are electrically-charged in this fashion.

Fibrous electret webs also have been produced by charging them with a corona. U.S. Pat. No. 4,588,537 to Klaase et al., for example, shows a fibrous web that is continuously fed into a corona discharge device while positioned adjacent to one major surface of a substantially-closed dielectric foil. The corona is produced from a high-voltage source that is connected to oppositely-charged thin tungsten wires. Another high-voltage technique for imparting an electrostatic charge to a nonwoven web is described in U.S. Pat. No. 4,592,815 to Nakao. In this charging process, the web is brought into tight contact with a smooth-surfaced ground electrode.

Fibrous electret webs also may be produced from polymer films or foils, as described in U.S. Pat. No. Re. 30,782, U.S. Pat. No. Re. 31,285, and Re. 32,171 to van Turnhout. The polymer films or foils are electrostatically charged before being fibrillated into fibers that are subsequently collected and processed into a nonwoven fibrous filter.

Mechanical approaches also have been used to impart an electric charge to polymeric fibers. U.S. Pat. No. 4,798,850 to Brown describes a filter material that contains a mixture of two different crimped synthetic polymer fibers that have been carded into a fleece and then needled to form a felt. The patent describes mixing the fibers well so that they become electrically-charged during the carding. The process disclosed in Brown is commonly referred to as "tribocharging".

Tribocharging also can occur when high-velocity uncharged jets of gases or liquids are passed over the surface of a dielectric film. In U.S. Pat. No. 5,280,406, Coufal et al. disclose that when jets of an uncharged fluid strike the surface of the dielectric film, the surface becomes charged.

A more recent development uses water to impart electric charge to a nonwoven fibrous web (see U.S. Pat. No. 5,496,507 to Angadjivand et al.). Pressurized jets of water or a stream of water droplets are impinged onto a nonwoven web that contains nonconductive microfibers to create an electret web. The resulting charge provides filtration-enhancing properties. Subjecting the web to an air corona discharge treatment before the hydrocharging operation can further enhance electret performance.

Adding certain additives to polymeric fibrous webs has improved the filtration performance of electrets. An oily-mist resistant electret filter media, for example, has been provided by including a fluorochemical additive in melt-blown polypropylene microfibers; see U.S. Pat. Nos. 5,411, 576 and 5,472,481 to Jones et al. The fluorochemical additive has a melting point of at least 25° C. and a molecular weight of about 500 to 2500.

U.S. Pat. No. 5,908,598 to Rousseau et al. describes a method where an additive is blended with a thermoplastic resin to form a fibrous web. Jets of water or a stream of water droplets are impinged onto the web at a pressure sufficient to provide the web with filtration-enhancing electret charge. The web is subsequently dried. The additives may be (i) a thermally stable organic compound or oligomer, which compound or oligomer contains at least one perfluorinated moiety, (ii) a thermally stable organic triazine compound or oligomer which contains at least one nitrogen atom in addition to those in the triazine group, or (iii) a combination of (i) and (ii).

Other electrets that contain additives are described in U.S. Pat. No. 5,057,710 to Nishiura. The polypropylene electrets disclosed in Mishiura contain at least one stabilizer selected from hindered amines, nitrogen-containing hindered phenols, and metal-containing hindered phenols. The patent discloses that an electret that contains these additives can offer high heat-stability. The electret treatment was carried out by placing the nonwoven fabric sheet between a needle-like electrode and an earth electrode. U.S. Pats. No. 4,652, 282 and 4,789,504 to Ohmori et al. describe incorporating a fatty acid metal salt in an insulating polymer to maintain high dust-removing performance over a long period of time. Japanese Patent Kokoku JP60-947 describes electrets that comprise poly 4-methyl-1-pentene and at least one compound selected from (a) a compound containing a phenol hydroxy group, (b) a higher aliphatic carboxylic acid and its metal salts, (c) a thiocarboxylate compound, (d) a phosphorous compound, and (e) an ester compound. The patent indicates that the electrets have long-term storage stability.

A recently-published U.S. Patent discloses that filter webs can be produced without deliberately post-charging or electrizing the fibers or the fiber webs (see U.S. Pat. 5,780,153 to Chou et al.). The fibers are made from a copolymer that comprises: a copolymer of ethylene, 5 to 25 weight percent of (meth)acrylic acid, and optionally, though less preferably, up to 40 weight percent of an alkyl (meth)acrylate whose alkyl groups have from 1 to 8 carbon atoms. Five to 70%/o of the acid groups are neutralized with a metal ion, particularly zinc, sodium, lithium or magnesium ions, or mixtures of these. The copolymer has a melt index of 5 to 1000 grams (g) per 10 minutes. The remainder may be a polyolefin such as polypropylene or polyethylene. The fibers may be produced through a melt-containing blowing process and may be cooled quickly with water to prevent excess bonding. The patent discloses that the fibers have high static retention of any existing or deliberate, specifically induced, static charge.

SUMMARY OF THE INVENTION

The present invention provides a new method of making a fibrous electret. The method may suitably comprise or consist essentially of: wetting a web that contains nonconductive fibers by contacting the fibers with a nonaqueous polar liquid. After wetting, the web is substantial dried to create the fibrous electret web. The present invention is also directed to a filtration face mask that uses the inventive fibrous electret web.

The present method differs from known charging methods in that the charge is imparted onto the fibrous web through use of a nonaqueous polar liquid. Before this invention, fibrous webs were commonly charged by a corona discharge device or by a hydrocharging operation (see, e.g., U.S. Pat. No. 4,588,537 to Klasse et al., U.S. Pat. No. 4,592,815 to Nakao, or U.S. Pat. No. 5,496,507 to Angadjivand et al.). Rather than use high voltages or water, the present invention uses a nonaqueous polar liquid. The use of such a liquid is advantageous over corona charging operations in that it can avoid the need for high voltages and their accompanying energy requirements. And because the nonaqueous liquid is generally more volatile than water, the inventive method is advantageous over hydrocharging operations in that it can lower the energy requirements associated with drying. Additionally, there are filter webs that can be directly wetted with nonaqueous liquids but cannot be easily wetted with water. Thus the use of a nonaqueous polar liquid may be desirable in situations where water may not be appropriately used to charge the web.

As used in this document in reference to the invention:

"effective amount" means the nonaqueous polar liquid is used in quantities sufficient to enable an electret to be produced from contacting the fibers with the polar liquid followed by drying;

"electret" means an article that possesses at least quasi-permanent electric charge. "electric charge" means that there is charge separation;

"fibrous" means possessing fibers and possibly other ingredients;

"fibrous electret web" refers to a woven or nonwoven web that contains fibers and that possesses a persistent electric charge;

"liquid" means the state of matter between a solid and a gas;

"nonaqueous liquid" is a liquid that contains less than 10 volume percent water;

"nonconductive" means possessing a volume resistivity of greater than $10^{14}$ ohm·cm at room temperature (22° C.);

"nonwoven" means a structure or portion of a structure in which the fibers are held together by a means other than weaving;

"polar liquid" means a liquid that has a dipole moment of at least about 0.5 Debye and that has a dielectric constant of at least about 10;

"polymer" means an organic material that contains repeating linked molecular units or groups that are regularly or irregularly arranged;

"polymeric" means containing a polymer and possibly other ingredients;

"polymeric fiber-forming material" means a composition that contains a polymer, or that contains monomers capable of producing a polymer, and possibly contains other ingredients, and that is capable of being formed into solid fibers;

"quasi-permanent" means that the electric charge resides in the web under standard atmospheric conditions (22° C., 101,300 Pascals atmospheric pressure, and 50% humidity) for a time period long enough to be significantly measurable;

"saturating" means wetting the web with the maximum, or substantially the maximum, amount possible of a liquid;

"staple fiber" refers to fibers that are cut to a generally defined length, typically about 2 centimeters to about 25 centimeters, and that have an effective fiber diameter of at least 15 micrometers;

"thermoplastic" means a polymeric material that softens when exposed to heat;

"web" means a structure that is significantly larger in two dimensions than in a third and that is air permeable;

"wetting" means contacting or coating substantially all the surface area of the web that is desired to be wetted.

BRIEF DESCRIPTION THE DRAWING

DETAILED DESCRIPTION OF PREFERRED EMBODIMENTS

In the present invention, an electrostatic charge is imparted to the fibrous web by wetting it with a nonaqueous polar liquid followed by a drying step. The fibrous web contains nonconductive fibers; and after being wetted and having the nonaqueous polar liquid removed through drying, a fibrous electret web is created that may be suitable for use as a filter.

Nonwoven fibrous electret webs that have been produced in accordance with the present invention exhibit at least a quasi-permanent electric charge. Preferably, the nonwoven fibrous electret webs exhibit a "persistent" electric charge, which means that the electric charge resides in the fibers and hence the nonwoven web for at least the commonly-accepted useful life of the product in which the electret is employed.

A test for determining the filtration performance of a fibrous web is known as the DOP Penetration and Pressure Drop Test, discussed below. The test involves forcing dioctyl phthalate (DOP) particles through the fibrous web and measuring the penetration of the particles through the web and the pressure drop across the web. From the measured DOP penetration and pressure drop, a quality factor (QF) may be calculated. The filtration efficiency of an electret can be generally estimated from an Initial Quality Factor, $QF_i$. An Initial Quality Factor, $QF_i$, is a Quality Factor QF that has been measured before the nonwoven fibrous electret web has been loaded—that is, before the web has been exposed to an aerosol that is intended to be filtered.

Preferred nonwoven fibrous electret webs produced according to the invention may possess sufficient electric charge to enable the product to exhibit a $QF'$ value of greater than 0.10 (millimeters (mm) $H_2O)^{-1}$, more preferably greater than 0.20 (mm $H_2O)^{-1}$, still more preferably greater than 0.40 (mm $H_2O)^{-1}$, and even more preferably greater than 0.60 (mm $H_2O)^{-1}$ when tested according to the DOP Penetration and Pressure Drop Test described below. The quality factor of a nonwoven fibrous electret web of the invention preferably exceeds, by at least a factor of 2, the QF value of an untreated web of essentially the same construction, and more preferably by a factor of at least 5.

Figure 1:
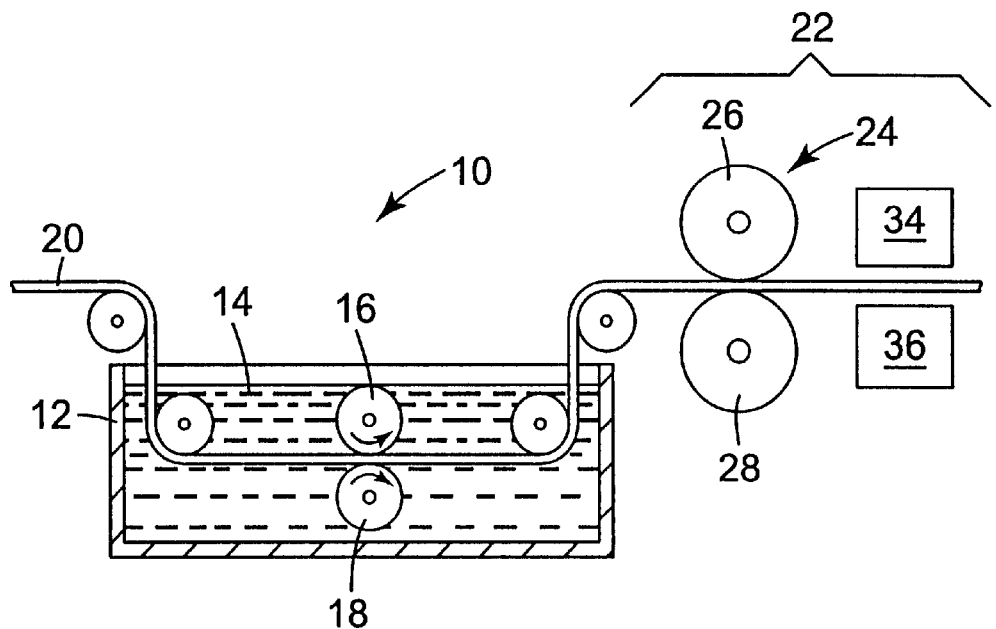
FIG. 1 is a partially-broken schematic side view of an apparatus 10 for wetting and drying a fibrous web 20 in accordance with the present invention.

FIG. 1 shows a method for making a fibrous electret web according to the invention. The fibrous web 20 is directed to an apparatus 10 that includes a vessel 12 that contains a nonaqueous polar liquid 14. A nip that comprises rollers 16, 18 compresses and releases the fibrous web 20 while it is submerged in the liquid 14. When the fibrous web 20 re-expands, the nonaqueous polar liquid 14 enters the interstitial spaces between the fibers to wet the web 20. The nip is beneficial to the wetting step because it assists in removing gas from the web. After emerging from vessel 12, the web is then directed to an active drying apparatus 22 that can include a wringer 24 and mating rollers 26 and 28. Rollers 26 and 28 squeeze excess nonaqueous polar liquid from web 20 before the web passes through heating elements 34, 36 disposed on opposing sides of the web 20.

The active drying apparatus may be an external source that consumes supplied energy for purposes of encouraging moisture to leave the web. An active drying apparatus may include a heat source such as a flow-through oven, a vacuum source, or an air source such as a convective air apparatus, that is, a stream of a drying gas. These drying mechanisms may or may not be used in conjunction with mechanical mechanisms such as a centrifuge or rollers to squeeze the polar liquid from the fibrous web. Alternatively, a passive drying mechanism, such as ambient air drying, may be used to dry the fibrous web—although air drying is generally not practical for high speed manufacturing requirements. The invention contemplates essentially any operation or apparatus that is capable of encouraging moisture to leave the web without causing significant structural damage to the final product. The resulting electret web can then be cut into sheets, rolled for storage, or be placed into various articles, such as in respirators or filters.

Upon being dried, the nonwoven web possesses sufficient electric charge to qualify as an electret. The resulting electret web may also be subjected to further charging techniques that might further enhance the electret charge on the web or might perform some other alteration to the electret charge that could possibly improve filtration performance. For example, the nonwoven fibrous electret web could be exposed to a corona charging operation after (or perhaps before) producing an electret using the process described above. The web could be charged, for example, as described in U.S. Pat. No. 4,588,537 to Klaase et al., or as described in U.S. Pat. No. 4,592,815 to Nakao. Alternatively—or in conjunction with the noted charging techniques—the web could also be further hydrocharged as described in U.S. Pat. No. 5,496,507 to Angadjivand et al. The charge of the fibrous electret web also may be supplemented using charging techniques disclosed in the commonly assigned U.S. patent application Ser. No. 09/415,566 entitled Method and Apparatus for Making a Nonwoven Fibrous Electret Web from Free-Fiber and Polar Liquid, filed Oct. 8, 1999, and Ser. No.09/415,291 entitled Method and Apparatus for Making a Fibrous Electret Web Using a Wetting Liquid and an Aqueous Polar Liquid, filed Oct. 8, 1999.

The web can be transported through the apparatus by essentially any device that is capable of moving the web from the wetting mechanism to the drier. A driven roller is an example of a transport that may be suitable for this purpose, as well as a conveyor, belt, or nip.

The surface tension of the nonaqueous polar liquid used in the wetting step appears to play an important role in imparting an electric charge to the fibrous web. For example, if the surface tension of the nonaqueous polar liquid is significantly less than the surface energy of the web, little or no charging may occur. Therefore, it is preferred in the present invention that the nonaqueous polar liquid have a surface tension that is at least 5 dynes per centimeter (dynes/cm) greater than, and more preferably 10 dynes/cm greater than, the surface energy of the fibrous web.

Depending upon the composition of the nonaqueous polar liquid and the fibrous web, wetting and drying can be a quiescent process, such as soaking the web in the nonaqueous polar liquid for a period of time, removing the web from the liquid, and allowing it to air dry. Additionally, energy or mechanical work can be applied to the nonaqucous polar liquid and/or the fibrous web to improve wetting, using, for example, the nip discussed above. Although the wetting step is shown in FIG. 1 as being carried out by submerging the fibrous web in the nonaqueous polar liquid, any other suitable wetting step is contemplated for use in the this invention. For example, the fibrous web may be wetted by directing a flow of the nonaqucous polar liquid at the web, for example, by spraying the web using, for example, the method and apparatus disclosed in U.S. Pat. No. 5,496,507 (Angadjivand et al.). Alternatively, wetting may be encouraged through use of a vacuum bar, a pressurized vessel, and/or mechanical agitation such as ultrasonic vibrations. These techniques are more filly described in copending application U.S. Ser. No. 09/415,291 entitled Method and Apparatus for Making a Fibrous Electret Web Using a Wetting Liquid and an Aqueous Polar Liquid filed on the same day as this application. Nonwoven fibrous webs, however, especially webs of microfibers, can be damaged if excess energy or mechanical work is used to achieve wetting.

The wetting liquid should wet all exposed surface areas of the fibers that are intended to be charged. The nonaqueous polar liquid may make contact, preferably, intimate contact, with the fibers or it may fill the voids between the fibers. Preferably, the wetting step is carried out such that the web becomes substantially saturated with the nonaqueous polar liquid. The web may become so saturated that the nonaqueous polar liquid drips from the web after the wetting step. A variety of techniques may be used for carrying out the wetting step. For applications where the wetting step is performed by spraying the nonaqueous polar liquid, mechanical agitation of the web or the polar liquid, or other mechanical methods, the velocity of the nonaqueous polar liquid relative to the nonwoven web is preferably less than about 50 meters/second, and more preferably less than about 25 meters/second. The nonaqueous polar liquid is preferably wetted on the fibers of the fibrous web for at least 0.001 seconds and typically for several seconds to several minutes.

Nonaqueous polar liquids suitable for use in the present method have a dipole moment of at least about 0.5 Debye, and more preferably at least about 0.75 Debye and most preferably at least about 1.0 Debye. The dielectric constant ($\in$) is at least about 10, more preferably at least about 20, and still more preferably at least 40. The nonaqueous polar liquid preferably does not leave a conductive, non-volatile residue that would mask or dissipate the charge on the web.

In general, there tends to be a correlation between the dielectric constant of the liquid and the degree of filtration performance enhancement. Liquids that have higher dielectric constants tend to show greater filtration performance enhancement. Examples of nonaqueous liquids suitable for use in this invention include methanol, isopropanol, ethylene glycol, dimethyl sulfoxide, dimethylformamide, acetonitrile, and acetone, among others, and combinations of these liquids.

The nonaqueous liquid contains less than 10 volume % water, typically less than about 5 volume % water, and more typically contains less than 2 volume % water. In some instances, no water is present in the nonaqueous polar liquid.

Webs suitable for use in this present invention may be made from a variety of techniques, including air laid processes, wet laid processes, and melt blown processes such as described in Van A. Wente, *Superfine Thermoplastic Fibers*, 48 Indus. Engn. Chem. 1342–46 and in Report No. 4364 of the Naval Research Laboratories, published May 25, 1954, entitled *Manufacture of Super Fine Organic Fibers* by Van A. Wente et al. Microfibers, particularly meltblown microfibers, are particularly suitable for use in fibrous webs that are used as filters. "Microfiber" means fiber(s) that have an effective diameter of about 25 micrometers or less. Effective fiber diameter can be calculated using equation number 12 in Davies, C.N., *The Separation of Airborne Dust and Particles,* Inst. Mech. Engn., London Proc. 1B (1952). For filtering applications, the microfibers preferably have an effective fiber diameter of less than 20 micrometers, and more preferably about 1 to about 10 micrometers.

Staple fibers may also be combined with the microfibers to provide a more lofty, less dense web. Reducing web density can reduce the pressure drop across the web. Lower pressure drops are desirable in personal respirators because it can make the respirator more comfortable to wear. Preferably, no more than about 90 weight percent staple fibers are present, more preferably no more than about 70 weight percent. Webs that contain staple fibers are disclosed in U.S. Pat. No. 4,118,531 to Hauser.

Active particulate also may be included in the electret webs for various purposes, including sorbent purposes, catalytic purposes, and others. U.S. Pat. No. 5,696,199 to Senkus et al., for example, describes various active particulate that may be suitable. Active particulate that has sorptive properties—such as activated carbon or alumina—may be included in the web to remove organic vapors during filtration operations. The active particulate may be present in general in amounts up to about 80 volume percent of the contents of the web. Particle-loaded nonwoven webs are described, for example, in U.S. Pat. No. 3,971,373 to Braun, U.S. Pat. No. 4,100,324 to Anderson, and 4,429,001 to Kolpin et al.

Polymers, which may be suitable for use in producing fibers that are useful in this invention, include thermoplastic organic nonconductive polymers. These polymers are generally capable of retaining a high quantity of trapped charge and are capable of being processed into fibers, such as through a melt-blowing apparatus or a spun-bonding apparatus. The term "thermoplastic" refers to a polymeric material that softens when exposed to heat. The term "organic" means the backbone of the polymer includes carbon atoms. Preferred polymers include polyolefins, such as polypropylene, poly4-methyl-1-pentene, blends or copolymers containing one or more of these polymers, and combinations of these polymers. Other polymers may include polyethylene, other polyolefins, polyvinylchlorides, polystyrenes, polycarbonates, polyethylene terephthalate, other polyesters, and combinations of these polymers, and other nonconductive polymers.

The fibers may be made from these polymers in conjunction with other suitable additives. The fibers also may be extruded or otherwise formed to have multiple polymer components. See U.S. Pat. No. 4,729,371 to Krueger and Dyrud and U.S. Pat. Nos. 4,795,668, and 4,547,420 to Krueger and Meyer. The different polymer components may be arranged concentrically or longitudinally along the length of the fiber to create, for example, a bicomponent fiber. The fibers may be arranged to form a macroscopically homogeneous web, which is a web that is made from fibers that each have the same general composition.

The fibers used in the invention do not need to contain ionomers, particularly metal ion neutralized copolymers of ethylene and acrylic or methacrylic acid or both to produce a fibrous product suitable for filtration applications. Nonwoven fibrous electret webs can be suitably produced from the polymers described above without containing 5 to 25 weight percent (meth)acrylic acid with acid groups partially neutralized with metal ions.

The performance of the electret web can be enhanced by including additives in the fiber-forming material before contacting it with a polar liquid. Preferably, an "oily-mist performance enhancing additive" is used in conjunction with the fibers or the fiber-forming materials. An "oily-mist performance enhancing additive" is a component that, when added to the fiber-forming material, or for example, is placed on the resulting fiber, is capable of enhancing the oily-aerosol filtering ability of the nonwoven fibrous electret web.

Fluorochemicals can be added to the polymeric material to enhance electret performance. U.S. Pat. Nos. 5,411,576 and 5,472,481 to Jones et al. describe the use of a melt-processable fluorochemical additive that has a melt temperature of at least 25° C. and has a molecular weight of about 500 to 2500. This fluorochemical additive may be employed to provide better oily-mist resistance. One additive class that is known to enhance electrets that have been charged with water jets are compounds that have a perfluorinated moiety and a fluorine content of at least 18% by weight of the additive—see U.S. Pat. No. 5,908,598 to Rousseau et al. An additive of this type is a fluorochemical oxazolidinone described in U.S. Pat. No. 5,411,576 as "Additive A" of at least 0.1% by weight of the thermoplastic material.

Other possible additives are thermally stable organic triazine compounds or oligomers, which compounds or oligomers contain at least one nitrogen atom in addition to those in the triazine ring. Another additive known to enhance electrets charged by jets of water is Chimassorb™ 944 LF (poly[[6-(1,1,3,3,-tetramethylbutyl)amino]-s-triazine-2,4-diyl][[(2,2,6,6-tetramethyl-4-piperidyl)imino] hexamethylene[(2,2,6,6-tetramethyl-4-piperidyl)imino]]), available from Ciba-Geigy Corp. Chimassorba™ 944 and "Additive A" may be combined. Preferably the additive Chimassorb™ and/or the above additives are present in an amount of about 0.1% to about 5% by weight of the polymer; more preferably, the additive(s) is present in an amount from about 0.2% to about 2% by weight of the polymer; and still more preferably is present in an amount from about 0.2 to about 1 weight % of the polymer. Some other hindered amines are also known to increase the filtration-enhancing charge imparted to the web.

Fibers that contain additives can be quenched after shaping a heated molten blend of the polymer and additive— followed by annealing and charging steps—to create an electret article. Enhanced filtration performance can be imparted to the article by making the electret in this manner—see U.S. patent application Ser. No. 08/941,864, which corresponds to International Publication WO 99/16533. Additives also may be placed on the surfaces of the fibers in the web after its formation by, for example, using the surface fluorination technique described in U.S. patent application Ser. No. 09/109,497, filed Jul. 2, 1998 by Jones et al.

The polymeric fiber-forming material has a volume resistivity of $10^{14}$ ohm·cm or greater at room temperature. Preferably, the volume resistivity is about $10^{16}$ ohm·cm or greater. Resistivity of the polymeric fiber-forming material can be measured according to standardized test ASTM D 257-93. The fiber-forming material used to form the melt blown fibers also should be substantially free from components such as antistatic agents, which could increase the electrical conductivity or otherwise interfere with the fiber's ability to accept and hold electrostatic charges.

Nonwoven webs of this invention may be used in filtering masks that are adapted to cover at least the nose and mouth of a wearer.

Figure 2:
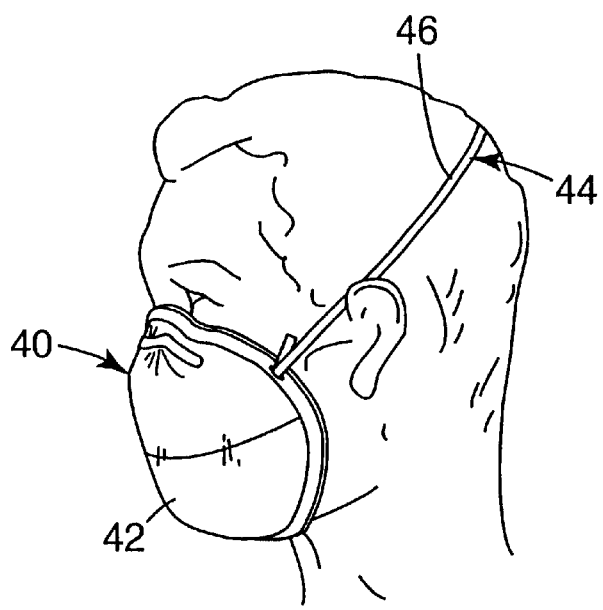
FIG. 2 is an example of a filtering face mask 40 that can utilize an electret filter medium that has been produced in accordance with the present invention.

FIG. 2 illustrates a filtering face mask 40 that may be constructed to contain an electrically-charged nonwoven web that is produced according to the present invention. The generally cup-shaped body portion 42 is adapted to fit over the mouth and nose of the wearer. The electret filter media is disposed in the mask body 42, typically over substantially the whole surface area, to remove contaminants from the inhaled air. The electret filter media may be supported by other layers, such as shaping layers that are made from thermally bonded fibers, such as bicomponent fibers that have an outer thermoplastic component that enables the fibers to bond to other fibers at points of fiber intersection. Examples of other filtering face masks where nonwoven fibrous electret webs may be used include U.S. Pat. No. 4,536,440 to Berg, U.S. Pat. No. 4,807,619 to Dyrud et al., U.S. Pat. No. 4,883,547 to Japuntich, U.S. Pat. No. 5,307,796 to Kronzer et al., and U.S. Pat. No. 5,374,458 to Burgio. The electret filter media also may be used, for example, in a filter cartridge for a respirator, such as the filter cartridge disclosed in U.S. Pat. No. Re. 35,062 to Brostrom et al. or in U.S. Pat. No. 5,062,421 to Burns and Reischel. Mask 40 thus is presented for illustration purposes only, and use of the present electret filter media is not limited to the embodiment disclosed. The body portion 42 is porous so that inhaled air can pass through it.

A strap or harness system 44 may be provided to support the mask 40 on the wearer's face. Although a single strap 46 is illustrated in FIG. 4, the harness 44 may employ more than one strap 46 and may come in a variety of configurations; see, for example, U.S. Pat. No. 4,827,924 to Japuntich et al., U.S. Pat. No. 5,237,986 to Seppalla et al., and U.S. Pat. No. 5,464,010 to Byram.

Applicants believe that the present charging method deposits both positive and negative charge onto the fibers such that the positive and negative charge is randomly dispersed throughout the web. Random charge dispersal produces an unpolarized web. Thus, a nonwoven fibrous electret web produced in accordance with the present invention may be substantially unpolarized in a plane normal to the plane of the web. Fibers that have been charged in this manner ideally exhibit the charge configuration shown in FIG. 5C of U.S. patent application Ser. No. 08/865,362. If the fibrous web is also subjected to a corona charging operation, it would exhibit a charge configuration similar to the configuration shown in Figure 5B of that patent application. A web, formed from fibers charged solely using the present method, typically has unpolarized trapped charge throughout the volume of the web. "Substantially unpolarized trapped charge" refers to a fibrous electret web that exhibits less than 1 $\mu C/m^2$ of detectable discharge current using TSDC analysis, where the denominator is the electrode surface area. This charge configuration can be shown by subjecting the web to thermally-simulated discharge current (TSDC).

Thermally-stimulated discharge analysis involves heating an electret web so that the frozen or trapped charge regains mobility and moves to some lower energy configuration to generate a detectable external discharge current. For a discussion on thermally-stimulated discharge current, see Lavergne et al., *A review of Thermo-Stimulated Current*, IEEE Electrical Insulation Magazine, vol. 9, no. 2, 5–21, 1993, and Chen et al., *Analysis of Thermally Stimulated Process*, Pergamon Press, 1981.

An electric charge polarization can be induced in a web that has been charged according to the present invention by elevating the temperature to some level above the glass transition temperature ($T_g$) of the polymer, which is the temperature where a polymer changes to a viscous or rubbery condition from a hard and relatively-brittle one. The glass-transition transition temperature, $T_g$ is below the polymer's melting point ($T_m$). After raising the polymer above its $T_g$, the sample is cooled in the presence of a DC electric field to freeze-in the polarization of the trapped charge. Thermally-stimulated discharge currents can then be measured by reheating the electret material at a constant heating rate and measuring the current generated in an external circuit. An instrument useful for performing the polarization and subsequent thermally-stimulated discharge is a Solomat TSC/RMA model 91000 with a pivot electrode, distributed by TherMold Partners, L.P., Thermal Analysis Instruments of Stamford, Connecticut.

The discharge current is plotted on the y axis (ordinate) against the temperature on the x axis (abscissa). The peak (current maximum) position and shape of the discharge current are characteristics of the mechanism by which the charges have been stored in the electret web. For electret webs that contain a charge, the peak maximum and shape are related to the configuration of the charge trapped in the electret material. The amount of charge produced in the outside circuit due to movement of the charge inside the electret web to a lower energy state upon heating can be determined by integrating the discharge peak(s).

Fibrous electret webs of the invention exhibit a Measured Charge Density, which is a measure of the relative amount of unpolarized trapped charge. The Measured Charge Density can be ascertained using the procedure described below. Fibrous electret webs of the invention preferably exhibit a Measured Charge Density of at least about 0.12 microcoloumbs per square meter ($\mu C/m^2$), more preferably a Measured Charge Density of at least about 0.2 $\mu C/m^2$, and still more preferably at least about 0.3 1 $\mu C/m^2$. In some instances, Measured Charge Density can exceed 0.6 $\mu C/m^2$.

Advantages and other properties and details of this invention are further illustrated in the following Examples. Although the examples serve this purpose, the particular ingredients and amounts used and other conditions are not to be construed in a manner that would unduly limit the scope of this invention. For example, while the Examples illustrate inventive methods that produce products on an individual basis, the processes can also be performed continuously. The Examples selected for disclosure below are merely illustrative of how to make a preferred embodiment of the invention and how the articles may generally perform.

EXAMPLES

Sample Preparation

The nonwoven web was prepared generally as described by Van A. Wente, 48 Indus. and Engn. Chem., 1342–46 (1956). The thermoplastic resin was FINA 3860X polypropylene (available from Fina Oil and Chemical Co. in Houston, Tex.) unless otherwise specified. The extruder was a Berstorff 60 millimeter (mm), 44 to 1, eight barrel zone, co-rotating twin screw extruder available from Berstorff of Charlotte, N.C. When an additive was incorporated in the resin, it was prepared as a 10–15 weight percent concentrate in a Werner Pfleiderer 30 mm, 36 to 1 co-rotating twin screw extruder available from Werner & Pfleiderer Corp. of Ramsey, N.J. The basis weight of the web was about 54–60 grams/meter$^2$, unless otherwise specified.

DOP Penetration and Pressure Drop Test

The DOP Penetration and Pressure Drop Test was performed by forcing dioctyl phthalate (DOP) 0.3 micrometer mass median diameter particles through a sample of the nonwoven web which is 11.45 centimeters (4.5 inches) diameter at a rate of 42.5 liters/minute. The face velocity on the sample was 6.9 centimeters per second. The DOP particles were generated using a TSI No. 212 sprayer (available from TSI of St. Paul, Minn.) that had four orifices and an air input where 207 kilo pascals (kPa)(30 psi) of clean air was used to generate an aerosol that had a concentration of between about 70 and about 110 milligrams of DOP particles/meter$^3$. The samples were exposed to the aerosol that contained DOP particles for 30 seconds. The DOP particle penetration through the samples was measured with an optical scattering chamber, Percent Penetration Meter Model TPA-8F available from Air Techniques Inc. of Baltimore, Md. The pressure drop ($\Delta P$) across the sample was measured using an electronic manometer and was reported in millimeters of water (mmH$_2$O)$^-$.

The DOP penetration and pressure drop values were used to calculate a quality factor "QF value" from the natural log (ln) of the DOP penetration by the following formula:

$$QF[1/mm\ H_2O] = -(Ln\ ((DOP\ Pen\ \%)/100))/\text{Pressure Drop [mm } H_2O]$$

A quality factor that is measured from a product that has not previously been subjected to a challenge aerosol is referred to as an initial quality factor, $QF_i$. A higher initial QF value, indicates better initial filtration performance. And conversely, a lower initial QF value effectively correlates with decreased filtration performance.

Measured Charge Density

Electric charge polarizations were induced in four samples of each web by (i) heating each sample to a temperature of 100° C., (ii) poling each sample in the presence of a DC field of 2.5 kilovolts per millimeter (KV/mm) at 100° C. for poling periods of 5, 10, 15 or 20 minutes, and (iii) cooling each sample to −50° C. in the presence of the DC field to "freeze" the trapped and poled charge in the web. Each web sample was then reheated so that the frozen charge regained mobility and moved to a lower energy state, generating a detectable external discharge current. Specifically, after poling in the DC field mentioned above, each web sample was reheated from about −50° C. to about 160° C. at a heating rate of about 3° C./minute. The external current generated was measured as a function of temperature. The uncorrected measured charge density of each sample was determined by calculating the area under the discharge peaks and dividing the result by the area of the sample. The uncorrected measured charge density of each web was set equal to highest value of uncorrected measured charge density among the four samples analyzed for each web. Polarization and subsequent thermally-stimulated discharge was performed using a Solomat TSC/RMA Model 91000 with a pivot electrode, distributed by TherMold Partners, L.P., Thermal Analysis Instruments of Stanford, Connecticut. The measured charge density arising from trapped, unpolarized charge can be determined by analyzing an untreated web of the same composition and physical characteristics. The measured charge density of the treated web is determined by subtracting the uncorrected measured charge density of the untreated from the uncorrected measured charge density of the treated web.

Examples 1–8 and Comparative Example C1

A web of blown polypropylene microfibers was prepared as described above using FINA 3860X polypropylene (available from Fina Oil and Chemical Company). The basis weight of the web was about 50–60 grams/squared meter (g/m$^2$), and the effective fiber diameter (EFD) was about 8–9 micrometers ($\mu$m). Individual samples, about 22 inches by about 11 inches (55.9 centimeters by 27.9 centimeters), were cut from this web. The individual samples were saturated with a nonaqueous liquid by immersing the samples in the liquid, compressing the samples, and allowing them to expand while still being immersed in the liquid. The samples were then removed from the liquid and were air dried. Circular samples about 5.25 inches in diameter (13.3 centimeters) were cut from the samples and were used to determine DOP penetration and pressure drop as described above, using the center 4.5 inches (11.4 centimeters) of each circle. An initial quality factor, $QF_i$, was determined for each sample as described above. Duplicate samples were cut and were evaluated from each sample. Samples were also cut and evaluated from an untreated sample. The results of the duplicate evaluations were averaged and are given in Table 1.

TABLE 1

Effect of Nonaqueous Treatment on Filtration Performance

| Example No. | Liquid | Dipole Moment (Debye) | Dielectric Constant ($\epsilon$) | $QF_i$ (mm H$_2$O)$^{-1}$ |
|---|---|---|---|---|
| 1 | Acetone | 2.88 | 20.7 | 0.25 |
| 2 | Acetonitrile | 3.92 | 37.5 | 0.19 |
| 3 | Dimethylformamide | 3.82 | 36.71 | 0.38 |
| 4 | Dimethyl Sulfoxide | 3.96 | 46.6 | 0.22 |
| 5 | Ethylene Glycol | 2.28 | 37.0 | 0.28 |
| 6 | Isopropanol | 1.66 | 18.3 | 0.09 |
| 7 | Methanol | 1.70 | 32.6 | 0.30 |
| 8 | Acetic acid | 1.77 | 6.15 | 0.14 |
| C1 | None | none | none | 0.09 |

The data of Table 1 show that wetting a fibrous web with selected nonaqueous polar liquids and drying the web provides a web that has a good initial quality factor. The data also show that there is a tendency for liquids that have a higher dielectric constant to show greater filtration performance enhancement. Examples 9–16 and Comparative Example C2

A web that contained melt-blown microfibers was prepared as described in Examples 1–8 and Comparative Example C1, except the fluorochemical additive "Additive A" from U.S. Pat. No. 5,411,576 was added at a level of about 1 wt % of the polypropylene resin and the samples were annealed at a temperature of about 140° C. for about 10 minutes. Additive A had the following structure:

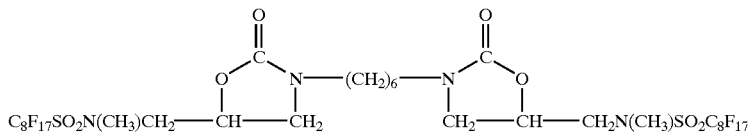

The resulting web was similar in basis weight and effective fiber diameter to that made without the additive. Individual samples were cut, wetted with liquid, and dried as in Examples 1–8. Circular samples were cut from these samples and were evaluated for filtration performance as before. The results of duplicate evaluations were averaged and are given Table 2.

TABLE 2

Effect of Nonaqueous Treatment on
Filtration Perfomance With Fluorochemical Additive A

| Example No. | Liquid | Dipole Moment (Debye) | Dielectric Constant ($\epsilon$) | $QF_i$ (mm $H_2O)^{-1}$ |
|---|---|---|---|---|
| 9 | Acetone | 2.88 | 20.7 | 0.23 |
| 10 | Acetonitrile | 3.92 | 37.5 | 0.30 |
| 11 | Dimethylformamide | 3.82 | 36.71 | 0.22 |
| 12 | Dimethyl sulfoxide | 3.96 | 46.6 | 0.38 |
| 13 | Ethylene Glycol | 2.28 | 37.0 | 0.62 |
| 14 | Isopropanol | 1.66 | 18.3 | 0.20 |
| 15 | Methanol | 1.70 | 32.6 | 0.40 |
| 16 | Acetic acid | 1.77 | 6.15 | 0.12 |
| C2 | None | none | none | 0.11 |

The data of Table 2 show a tendency for liquids that have a higher dielectric constant to show greater filtration performance enhancement. All of the samples tested also demonstrate improvement of the comparative example that was not treated according to the invention.

Examples 17–24 and Comparative Examples C3–C6

The samples of Examples 17–20 and C3–C5 were made from a blown polypropylene microfiber web that was prepared as described in reference to Examples 1–8 and C1, except ESCORENE 3505G polypropylene (available from Exxon Corp.) was used to make the fibers. Examples 21–24 and C5–C6 were also separately made from a blown polypropylene microfiber web in the same manner as 17–20 and C3–C5, except samples of Examples 21–24 and C5–C6 contained the fluorochemical additive "Additive A" from U.S. Pat. No. 5,411,576. Each webs basis weight was about 50–60 grams/square meter, and the effective fiber diameter of the samples was about 8–9 $\mu$m. The additive was added at a level of about 1 wt % of the polypropylene resin, and the samples were annealed at about 140° C. for about 10 minutes. All the Examples 17–24 and C3–C6 were treated according to the method of Examples 1–8 and C1. A $QF_i$ Value was determined for each sample.

The webs were then evaluated for Measured Charge Density as described above.

TABLE 3

Measured Charge Density after Polarization

| Example | Nonaqueous Polar Liquid | $QF_i$ Value (mm $H_2O)^{-1}$ | Uncorrected Measured Charge Density ($\mu C/m^2$) | Measured Charge Density ($\mu C/m^2$) |
|---|---|---|---|---|
| C3 | None | 0.09 | 0.05 | 0.00 |
| 17 | Acetone | 0.17 | 0.71 | 0.66 |
| 18 | Dimethyl Sulfoxide | 0.66 | 1.61 | 1.56 |
| C4 | n-hexane | 0.08 | 0.11 | 0.07 |
| 19 | Isopropanol | 0.09 | 0.07 | 0.02 |
| 20 | Morpholine | 0.17 | 0.66 | 0.61 |
| C5 | None | 0.14 | 8.95 | 0.00 |
| 21 | Acetone | 0.18 | 8.65 | −0.35 |
| 22 | Dimethyl Sulfoxide | 0.65 | 14.5 | 5.55 |
| C6 | n-hexane | 0.12 | 11.3 | 2.35 |
| 23 | Isopropanol | 0.17 | 10.58 | 1.63 |
| 24 | Morpholine | 0.29 | 9.78 | 0.83 |

The data of Table 3 show that webs wetted with liquids that had a higher dielectric constant had a tendency to show a greater Measured Charge Density and enhancement in filtration performance. Examples 21 and C6 do not follow the trend of the others (negative value and high value, respectively) probably because of effects related to solvents and fluorochemical additive.

Examples 25–26

Examples 25–26 are directed to the effect of liquid surface tension on charging BMF webs. Samples 11-by-21-inches (55.9 centimeters by 27.9 centimeters) in size of two different blown microfiber webs were wetted with solutions of ethanol and water to investigate the effect of liquid surface tension on electric charge creation. The two webs used contained fibers that were made from:

TABLE 4

| Example | Description | Surface Energy dynes/cm |
|---|---|---|
| 25 | FINA 3860 polypropylene + fluorochemical at 1 wt % of the polypropylene | 20 |
| 26 | FINA 3860 polypropylene | 30 |

Samples of Examples 25 and 26 were made according to the process of Example 1 using the materials of Table 4. Each sample was first treated with about 200 ml of ethanol in a plastic or aluminum pan. Each sample was also compressed to ensure that it was completely wetted and that substantially all entrapped air was removed. Sufficient water was then added to the pan to achieve one of eight specified surface tensions: 24, 26, 28, 30, 35, 40, 50 or 60 dyne/centimeter. The required amount of added water for each of the specified surface tensions was determined based on the Szyszkowski Equation as given in *The Properties of Gases* and Liquids, their Estimation and Correlation by Reid, Prausnitz and Sherwood (pp. 622–624, 3$^{rd}$ edition, McGraw-Hill, Inc., New York, 1977). The surface tensions investigated and the associated ethanol volume fractions and amounts of added water are given in Table 5 below:

TABLE 5

| Estimated Surface Tension (dyne/cm) | Volume fraction of ethanol | Volume of water added to 200 ml of ethanol (milliliters) |
| --- | --- | --- |
| 24 | 0.883 | 26.3 |
| 26 | 0.720 | 77.8 |
| 28 | 0.587 | 140. |
| 30 | 0.480 | 217 |
| 35 | 0.294 | 480. |
| 40 | 0.184 | 889. |
| 50 | 0.074 | 2510. |
| 60 | 0.027 | 7200. |

After was added to the pan, the sample was compressed for about 30 second while submerged and released. The sample was allowed to sit in the water/ethanol solution for about 5 minutes and then was compressed for about another 30 seconds and released. After watering about an additional 5 minutes, the sample was compressed again for about 30 seconds and was released. The sample was then passed through a wringer twices to remove excess liquid and hung from a string to dry overnight. Three 5.25-inch-diameter diameter circles were cut from each sample, and two of the circles were analyzed for filatation performance using the DOP Penetration and Pressure Drop Test discussed above. The average test results for each of the conditions appear in Table 6 below (each average is based on 2 measurements).

TABLE 6

| Estimated Surface Tension (dyne/cm) | Example 25 Quality Factor Average (mm H$_2$O)$^{-1}$ | Example 26 Quality Factor Average (mm H$_2$O)$^{-1}$ |
| --- | --- | --- |
| 24 | 0.747 (0.088) | 0.194 (0.033) |
| 26 | 0.936 (0.006) | 0.214 (0.036) |
| 28 | 0.952 (0.124) | 0.452 (0.008) |
| 30 | 0.807 (0.239) | 0.669 (0.023) |
| 35 | 1.161 (0.079) | 0.742 (0.056) |
| 40 | 1.169 (0.042) | 0.682 (0.064) |
| 50 | 0.873 (0.053) | 0.703 (0.043) |
| 60 | 0.609 (0.008) | 0.580 (0.020) |

The standard deviation is given in the parentheses.

The sample of Example 25, which contains about 1 wt % of the fluorochemical additive, was annealed at about 140° C. for about 10 minutes, had a fairly smooth curve with a maximum quality factor occurring for the water ethanol solution having an estimated surface tension of about 35 to about 40 dyne/centimeter. The sample of Example 26, which contained no fluorochemical additive, showed a sharp increase in quality factor for the range of estimated surface tension of about 24 to about 28 dyne/centimeter.

The sharp change in quality factor for the sample of Example 26 was probably due to the surface energy of the web. The surface energy of polypropylene manufactured without additives is about 30 dynes/cm. Liquids with surface tensions below this value would wet the fibers in the web as a film, whereas those with surface tensions above the surface energy would tend to form droplets at some point during wringing or drying. sample of Example 25, which contains the fluorochemical, appeared to have a much lower surface energy than the sample of Example 26 due to the presence of the additive. The sample of Example 25 would be expected to have a surface energy in the range of 20 dynes/cm or lower. Therefore, it would be lower than all of the surface tensions investigated in this example, which would appear to explain the absence of any sharp changes in quality factor as the surface tension is varied.

The patents and patent applications cited above, including those cited in the Background, are incorporated by reference in total.

This invention may be suitably practiced in the absence of any element not specifically recited above.

What is claimed is:

1. A method of making a fibrous electret web, which method comprises the steps of:
    wetting a web that comprises nonconductive fibers with an effective amount of a nonaqueous polar liquid that does not render the fibers conductive; and
    substantially drying the wetted web to form the fibrous electret web.

2. The method of claim 1, wherein the fibrous electret web exhibits a persistent electric charge.

3. The method of claim 2, wherein the fibrous electret web is a nonwoven fibrous web that contains microfibers.

4. The method of claim 1, wherein the fibrous electret web is capable of demonstrating a quality factor of at least about 0.2 (mm H$_2$O)$^{-1}$ when tested according to the DOP Penetration and Pressure Drop Test.

5. The method of claim 1, wherein the fibrous electret web is capable of demonstrating a quality factor of at least about 0.4 (mm H$_2$O)$^{-1}$ when tested according to the DOP Penetration and Pressure Drop Test.

6. The method of claim 1, wherein the fibers comprise a fluorochemical additive.

7. The method of claim 1, further comprising the step of annealing the fibrous web prior to the step of wetting the web.

8. The method of claim 1, wherein the web is wetted by compressing the web and permitting the web to return to an uncompressed state while immersed in the nonaqueous polar liquid.

9. The method of claim 1, wherein the web is wetted by directing a flow of the nonaqueous polar liquid at the web.

10. The method of claim 1, wherein the web is wetted by directing sonic energy through the nonaqueous polar liquid at the web.

11. The method of claim 1, wherein the web is wetted by pressurizing the nonaqueous polar liquid while in contact with the web.

12. The method of claim 1, wherein the web is wetted by soaking the web in the nonaqueous polar liquid.

13. The method of claim 1, wherein the nonaqueous polar liquid is selected from the group consisting of methanol, isopropanol, ethylene glycol, dimethyl sulfoxide, dimethylformamide, acetonitrile, and acetone.

14. The method of claim 1, wherein the web is air dried.

15. The method of claim 1, wherein the web is dried by exposing the web to heat.

16. The method of claim 1, wherein the web is dried by exposing the web to a static vacuum.

17. The method of claim 1, wherein the web is dried by exposing the web to a stream of a heated drying gas.

18. The method of claim 1, wherein the web is dried by mechanically removing the nonaqueous polar liquid.

19. The method of claim 1, wherein the fibers contain polypropylene, poly-4-methyl-1-pentence, or both of these polymers.

20. The method of claim 1, wherein the fibers contain a polyolefin, polyvinylchloride, polystyrene, polycarbonate, polyester or combination thereof.

21. The method of claim 1, wherein the fibrous electret web is capable of demonstrating a quality factor increase of at least a factor of 2 over an untreated fibrous web when tested according to the DOP Penetration and Pressure Drop Test.

22. The method of claim 1, wherein the fibrous electret web is capable of demonstrating a quality factor increase of at least a factor of 5 over an untreated fibrous web when tested according to the DOP Penetration and Pressure Drop Test.

23. The method of claim 1, wherein the fibrous electret web exhibits an unpolarized charge configuration in a plane normal to a plane of the web when subjected to thermally stimulated discharge.

24. The method of claim 1, wherein the fibers contain an oily-mist performance enhancing additive.

25. The method of claim 24, wherein the oily-mist performance enhancing additive is a fluorochemical.

26. The method of claim 24, wherein the fluorochemical additive is a fluorochemical oxazolidinone.

27. The method of claim 24, wherein the oily-mist performance enhancing additive is (poly[[6-(1,1,3,3,-tetramethylbutyl)amino]-s-triazine-2,4-diyl][[(2,2,6,6-tetramethyl-4-piperidyl)imino]hexamethylene[(2,2,6,6-tetramethyl-4-piperidyl)imino]].

28. The method of claim 1, wherein the nonconductive fibers have a volume resistivity of about $10^{16}$ ohm.·cm or greater.

29. The method of claim 1, wherein the web is saturated during the wetting step.

30. A method of making a fibrous electret web, consisting essentially of the steps of:

wetting thermoplastic, nonconductive fibers of a nonwoven web with a nonaqueous polar liquid; and substantially drying the web to form the fibrous electret web.

31. The method of claim 1, wherein the nonaqucous polar liquid has a surface tension that is at least 5 dynes per centimeter greater than the surface energy of the fibrous web.

32. The method of claim 1, wherein tie nonaqueous polar liquid has a surface tension that is at least 10 dynes per centimeter greater than the surface energy of the fibrous web.

33. The method of claim 1, wherein the nonaqueous polar liquid has a dipole moment of at least 0.5 Debye.

34. The method of claim 1, wherein the noniaquious polar liquid has a dipole moment of at least 0.75 Debye.

35. The method of claim 1, wherein the nonaqueous polar liquid has a dipole moment of at least 1 Debye.

36. The method of claim 1, wherein the nonaqueous polar liquid has a dielectric constant that is at least about 10.

37. The method of claim 1, wherein the nonaqueous polar liquid has a dielectric constant that is at least about 20.

38. The method of claim 1, wherein the nonaqucous polar liquid has a dielectric constant that is at least about 40.

39. The method of claim 1, wherein the nonaqueous polar liquid does not cave a conductive, non-volatile residue that would mask or dissipate charge on the web.

40. The method of claim 1, further comprising the step of placing fluorine atoms on the surface of the fibers in the web.

* * * * *

UNITED STATES PATENT AND TRADEMARK OFFICE
CERTIFICATE OF CORRECTION

PATENT NO. : 6,454,986 B1
DATED : September 24, 2002
INVENTOR(S) : Eitzman, Philip D.

It is certified that error appears in the above-identified patent and that said Letters Patent is hereby corrected as shown below:

Column 2,
Line 39, delete "Mishiura" and insert in place thereof -- Nishiura --.
Line 63, delete "$^{70}\%/o$" and insert in place thereof -- 70% --.

Column 3,
Line 13, delete "substantial" and insert in place thereof -- substantially --.

Column 6,
Line 21, delete "nonaqucous" and insert in place thereof -- nonaqueous --.
Line 28, delete "nonaqucous" and insert in place thereof -- nonaqueous --.
Line 34, delete "filly" and insert in place thereof -- fully --.

Column 8,
Line 55, delete "Chimassorba$^{TM}$" and insert in place thereof -- Chimassorb$^{TM}$ --.

Column 10,
Line 27, delete the second occurrence of the word "transition".
Line 58, delete the letter "I" following "0.3".

Column 12,
Line 59, move the words "Examples 9-16 and Comparative" to line 60 before the words "Example C2".

Column 15,
Line 30, delete "filatation" and insert in place thereof -- filtration --.
Line 65, delete "sample" and insert in place thereof -- Sample --.

UNITED STATES PATENT AND TRADEMARK OFFICE
CERTIFICATE OF CORRECTION

PATENT NO. : 6,454,986 B1
DATED : September 24, 2002
INVENTOR(S) : Eitzman, Philip D.

It is certified that error appears in the above-identified patent and that said Letters Patent is hereby corrected as shown below:

<u>Column 18,</u>
Line 5, delete "nonaqucous" and insert in place thereof -- nonaqueous --.
Line 15, delete "noniaquious" and insert in place thereof -- nonaqueous --.
Line 24, delete "nonaqucous" and insert in place thereof -- nonaqueous --.
Line 27, delete "cave" and insert in place thereof -- leave --.

Signed and Sealed this

Twenty-eighth Day of January, 2003

JAMES E. ROGAN
*Director of the United States Patent and Trademark Office*